July 25, 1961 C. F. BLOEDOW 2,993,573
CONNECTOR
Filed Sept. 1, 1959
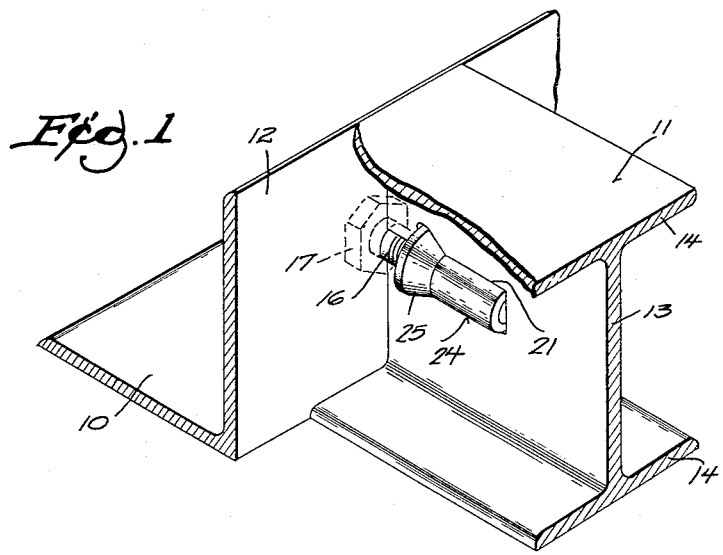
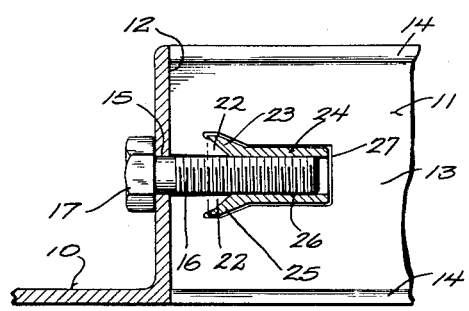
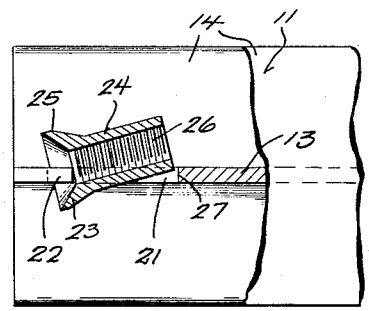
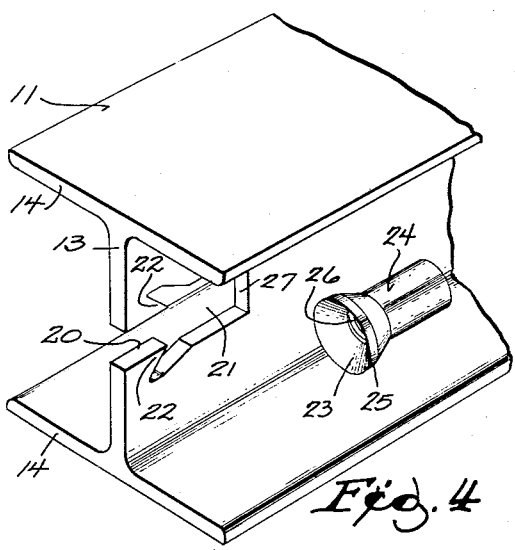
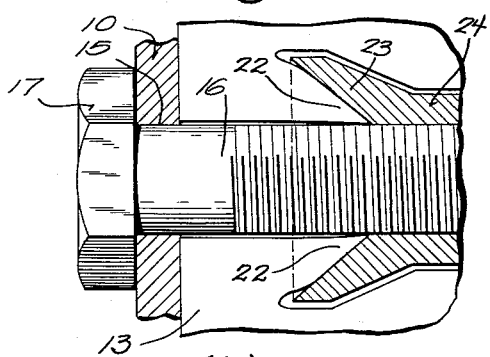
INVENTOR.
CLARENCE F. BLOEDOW
BY
Wheeler, Wheeler & Wheeler
ATTORNEYS ial Office 2,993,573
Patented July 25, 1961

2,993,573
CONNECTOR
Clarence F. Bloedow, 4917 N. 3rd St.,
Milwaukee 17, Wis.
Filed Sept. 1, 1959, Ser. No. 837,419
3 Claims. (Cl. 189—36)

This invention relates to a connector.

This application is a continuation in part of my co-pending application Serial No. 524,463, filed July 26, 1955, now abandoned.

The device of the present invention will greatly simplify and facilitate interconnection of abutting structural elements such as those used in the fabrication of window frames, sky lights, etc. Present day practice requires the use of complex riveted and bolted interconnecting members between T-joints and other joints between abutting members.

According to the present invention, however, a simple screw anchor is provided which is releasably positioned in a corresponding socket in one of said members to receive the shank of a screw which has its head engaged with the other member.

In devices embodying the present invention the anchor has inclined shoulders which bear against correspondingly inclined shoulders in the socketed member so that when the screw is advanced into the anchor, the shoulders of the socketed member will be cammed inwardly against the screw to lock the screw against loosening. Moreover, the anchor is made longer than the spacing between the innermost ends of the socket shoulders and the opposed socket end wall so that the anchor cannot be moved laterally in and out of the socket. In order to manipulate the anchor to and from emplacement to the socket, it must be moved pivotally about the shoulder as a fulcrum. This facilitates holding the anchor in place pending engagement with the screw.

Other objects, features and advantages of the invention will appear from the following disclosure in which:

FIG. 1 is a perspective view showing abutting structural elements interconnected by the connector of the present invention.

FIG. 2 is a longitudinal cross section taken through the interconnected elements of FIG. 1.

FIG. 3 is a horizontal cross section taken through the interconnected elements of FIG. 1.

FIG. 4 is a perspective view in spaced apart relation of the socketed element and the screw anchor.

FIG. 5 is a greatly enlarged detailed view, partly in cross section, showing the interconnection of the parts.

To exemplify the invention, the drawings illustrate the transverse connection between angle member 10 and I-beam 11. The angle member has a face 12 which abuts transversely against the end of I-beam web 13 and against the I-beam flanges 14. The flange 12 of angle member 10 is provided with an opening 15 through which the shank 16 of screw 17 extends.

The web 13 of the I-beam 11 is provided in alignment with the opening 15 with a screw passage 20 which communicates with the screw anchor socket 21. Socket 21 comprises an enlarged opening in the web 13. Portions of the web at opposite sides of the opening 20 and at one end of the socket 21 comprise inclined wedge-shaped projections 22 which resemble saw teeth extending into the socket. These projections provide inclined shoulders which cooperate with corresponding inclined shoulders 23 formed in the screw anchor 24.

Screw anchor 24 has an enlarged conically-shaped head 25 on the inner face of which the shoulders 23 are formed and which has a threaded bore 26 adapted to receive the threaded shank 16 of the screw 17.

As best shown in FIG. 3, the anchor is made somewhat longer overall than the spacing between the innermost projecting end portions of the web shoulders 22 and opposite end wall 27 of socket 21 so that in order to manipulate the anchor in and out of the socket 21, the anchor must be pivoted as illustrated in FIG. 3 with the fulcrums provided by web projections 22. Accordingly, when placed within the socket, the anchor cannot be removed simply by manipulating it laterally as it will be confined in the socket by the projections. It may be removed from the socket only by pivotally moving it as in FIG. 3. This facilitates the initial connection of the parts as the anchor will remain in place pending interconnection therewith with the screw.

When the screw is tightened, the pressure of the anchor against the inclined shoulders 22 will cam the shoulders against the shank 16 of the screw to lock the shoulders to the screw and prevent inadvertent loosening of the screw from the anchor. The web 13 is sufficiently yieldable to permit drawing the shoulders against the screw.

I claim:

1. The combination with abutting transversely disposed members, one of which has a web and the other of which has a face abutting the web, said face having a screw opening and the web having a screw passage aligned with said opening and an enlarged socket communicating with said screw passage, a screw disposed in said opening and passage and a screw anchor removably disposed in said socket and having a threaded bore aligned with the screw, said web being narrower than the anchor and having shoulders inclined to the axis of the screw and projecting into said socket, said anchor having an annular concave recess with shoulders complementary to the incline of the web shoulders to bear on the web shoulders at diametrically opposite points on the anchor shoulder, said web being sufficiently yieldable to permit the web shoulders to be drawn against said screw when the screw is tightened to cam the anchor shoulders against the web shoulders and thereby lock the web shoulders against the screw.

2. The combination with abutting transversely disposed members, one of which has a web and the other of which has a face abutting the web, said face having a screw opening and the web having a screw passage aligned with said opening and an enlarged socket communicating with said screw passage, a screw disposed in said opening and passage and a screw anchor removably disposed in said socket and having a threaded bore aligned with the screw, said web being narrower than the anchor and having shoulders inclined to the axis of the screw and projecting into said socket, said anchor having an annular concave recess with shoulders complementary to the incline of the web shoulders to bear on the web shoulders at diametrically opposite points on the anchor shoulder, said anchor being longer than the socket spacing between the inner ends of said web shoulders and the opposed socket end wall whereby the anchor is manipulated to and from emplacement in the socket only by moving it pivotally about said web shoulders as a fulcrum.

3. The combination with abutting transversely disposed members, one of which has a web and the other of which has a face abutting the web, said face having a screw opening and the web having a screw passage aligned with said opening and an enlarged socket communicating with said screw passage, a screw disposed in said opening and passage and a screw anchor removably disposed in said socket and having a threaded bore aligned with the screw, said web being narrower than the anchor and having shoulders inclined to the axis of the screw and projecting into said socket, said anchor having an annular concave recess with shoulders complementary to the incline of the web shoulders to bear on the web shoulders at diametrically opposite points on the anchor shoulder, said web being sufficiently yieldable to permit the web shoulders to be drawn against said screw when the screw is tightened to cam the anchor shoulders against the web shoulders and thereby lock the web shoulders against the screw, said anchor being longer than the socket spacing between the inner ends of said web shoulders and the opposed socket end wall whereby the anchor is manipulated to and from emplacement in the socket only by moving it pivotally about said web shoulders as a fulcrum.

References Cited in the file of this patent

UNITED STATES PATENTS

| | | |
|---|---|---|
| 167,118 | Pritchett | Aug. 24, 1875 |
| 280,841 | Lorey | July 10, 1883 |
| 1,062,015 | Lane | May 20, 1913 |
| 1,921,629 | McKee | Aug. 8, 1933 |
| 2,028,615 | Lenke | Jan. 21, 1936 |
| 2,390,730 | Northrop et al. | Dec. 11, 1945 |